Figure 1:
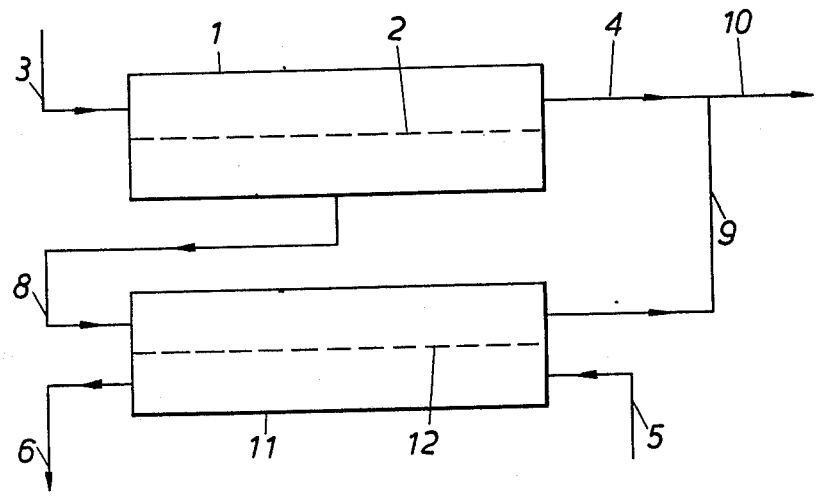

United States Patent [19]
Gigou et al.

[11] 3,926,797
[45] Dec. 16, 1975

[54] SEPARATION APPARATUS USING ULTRAFILTRATION

[75] Inventors: Claude Gigou, Vernaison; Jean-Pierre Quentin, Lyon, both of France

[73] Assignee: Rhone-Poulenc, S.A., Paris, France

[22] Filed: Mar. 15, 1972

[21] Appl. No.: 234,941

[30] Foreign Application Priority Data
Mar. 17, 1971  France .............................. 71.09359

[52] U.S. Cl. ...................... 210/22; 210/23; 210/321
[51] Int. Cl.² .................... B01D 31/00; B01D 13/00
[58] Field of Search ......................... 210/22, 23, 321

[56] References Cited
UNITED STATES PATENTS

| | | | |
|---|---|---|---|
| 3,004,909 | 10/1961 | Gregor et al. | 204/180 |
| 3,276,598 | 10/1966 | Michaels | 210/500 |
| 3,506,126 | 4/1970 | Serfass | 210/321 X |
| 3,579,441 | 5/1971 | Brown | 210/23 |
| 3,617,545 | 11/1971 | Dubois | 210/22 |
| 3,669,880 | 6/1972 | Marantz et al. | 210/321 |
| 3,727,612 | 4/1973 | Sayers et al. | 210/22 X |
| 3,839,200 | 10/1974 | Gigou et al. | 210/321 X |

FOREIGN PATENTS OR APPLICATIONS
1,584,187  12/1969  France

OTHER PUBLICATIONS
Henderson et al., Blood Purification and Fluid Replacement (Diafiltration), from Transactions, American Society for Artificial Organs, 1967 pp. 216–221.

*Primary Examiner*—Frank A. Spear, Jr.
*Attorney, Agent, or Firm*—Stevens, Davis, Miller & Mosher

[57] ABSTRACT
Apparatus is provided for the purification of a liquid, especially blood, which comprises:
a. an ultrafiltration cell and an ultrafiltration membrane dividing said cell into two compartments, an inlet and an outlet for said first compartment for the liquid to be treated and an outlet for the ultrafiltered liquid for said second compartment;
b. means for establishing in the first compartment of said ultrafiltration cell a pressure higher than that prevailing in the second compartment of the cell; and
c. a dialyser and an ionic membrane separating said dialyser into two compartments, an inlet for said first compartment connected to the outlet from the second compartment of the ultrafiltration cell and an outlet for said first compartment connected to the outlet of the first compartment of the ultrafiltration cell, the second compartment of said dialyser being itself equipped with an inlet and an outlet.

9 Claims, 2 Drawing Figures

SEPARATION APPARATUS USING ULTRAFILTRATION

The present invention relates to a separation apparatus which can be used especially for the purification of blood.

The apparatus of the present invention comprises (a) an ultrafiltration cell divided into two compartments by an ultrafiltration membrane, the first compartment being equipped with an inlet and an outlet for the liquid to be treated, and the second compartment being equipped with an outlet for the ultrafiltrate; (b) means for establishing in the first compartment of the ultrafiltration cell a pressure higher than that prevailing in the second compartment of the cell; and (c) a dialyser separated into two compartments by an ionic membrane, the first compartment of the dialyser containing, on the one hand, an inlet connected to the outlet from the second compartment of the ultrafiltration cell, and, on the other hand, an outlet connected to the outlet from the first compartment of the ultrafiltration cell, the second compartment of the dialyser being itself equipped with an inlet and an outlet in such a way that it can be traversed by a purifying liquid for the ultrafiltrate.

The ultrafiltration cells which form an essential part of the apparatus of this invention can be of any known type, in particular those described in French Pat. Nos. 1,252,995, 1,512,555 and 1,583,221, U.S. Pat. No. 3,341,024 and Canadian Pat. No. 819,509, and J. Appl. Polym. Sci. (1969) 13, 309–376 by R. W. BAKER.

The membranes, and hence the compartments of the cells themselves, can have, for example, a planar, conical, spiral or tubular shape. It is to be understood that, in this Specification, the term "membrane" includes hollow fibres acting as a membrane. Needless to say, a single ultrafiltration cell can be replaced by a number of such cells mounted in series or in parallel.

The ultrafiltration membranes themselves can be of any known type. In effect, they should be permeable to molecules (solvent or solute) of low molecular weight and impermeable to molecules of high molecular weight; the molecular weight range between molecules which do filter and those which do not is generally in the region of 1,000 to 40,000. More precisely, in the apparatus of this invention, membranes which are capable of retaining compounds of high molecular weight and the elements which occur in blood such as corpuscles, proteins, platelets and fibrinogen and which are capable of allowing water, salts and compounds of low molecular weight such as urea, uric acid, creatinine and sugars to pass through them are used.

Ultrafiltration membranes which can be used are described in, for example, Encyclopedia of Polymer Science and Technology, 10, 765–780, and in French Pat. Nos. 1,521,021 and 1,584,659. The principal types of ultrafiltration membranes which can be used, are microporous membranes, asymmetric membranes (having a skin), complex polyelectrolyte membranes of the bi-ionic type and membranes of the gel type (not microporous but having a loose structure).

The production, in the second compartment of the ultrafiltration cell, of a pressure lower than that prevailing in the first compartment, is usually achieved by means of a pump. It can be a pump with a blowing action placed upstream from the first compartment or, preferably, a pump with a sucking action placed downstream from the second compartment.

The dialyser which may be used in the apparatus of this invention can be of any known type, in particular of the type described in French Pat. No. 1,597,874. The membranes, and hence the compartments of the dialyser itself, can be, for example, of planar, conical, spiral or tubular (dialyser with hollow fibres) shape; needless to say, the single dialyser can be replaced by a number of dialysing elements mounted in series or in parallel, as with the ultrafiltration cell.

The so-called "ionic membranes" which are used in the dialyser are membranes comprising at least one polymer possessing anion or cation exchange groups; these groups can be, more particularly, carboxylic, sulphonic, phosphonic or phosphinic acid groups, optionally in the form of their salts, or sulphonium, phosphonium, or ammonium, especially quaternary ammonium, groups.

It is preferable to use those ionic membranes which have, on the one hand, a permeation selectivity, measured as in French Pat. No. 1,584,187, higher than 50%, and preferably higher than 70%, and, on the other hand, a urea/NaCl selectivity higher than 5, and preferably higher than 10. The permeation selectivity or selective permeability is determined as a percentage from the equation:

$$\frac{P}{100} = \frac{\overline{t^+} - t^+}{1 - t^+}$$

in which P is the selective permeability, $t^+$ is the transport number of the migrating ion in an 0.6M aqueous KCl solution and $\overline{t^+}$ the transport number of the migrating ion in the membrane. $\overline{t^+}$ is given by the formula:

$$\overline{t^+} = \frac{E + E_o}{2E_o}$$

in which $$E_o = \frac{RT}{F} \ln \frac{a_1}{a_2}$$

where R = gas constant, F = Faraday constant (96,489 coulombs per gram equivalent), $a_1$ = activity of the electrolyte in the more concentrated compartment (calculated from the concentration of the electrolyte and the activity coefficient), $a_2$ = activity of the electrolyte in the less concentrated compartment and E is the electromotive force existing between two aqueous solutions of KCl, 0.4 M and 0.8 M respectively, separated by the membrane under consideration, which has previously been saturated with a 0.6 aqueous KCl solution. The urea/NaCl selectivity ($S_{us}$) of a membrane is measured in the following manner: a 0.1 M aqueous solution of urea and 0.1 M aqueous solution of NaCl, are put into the first compartment of a two compartment cell separated by the membrane; an aqueous solution of which the glucose concentration is such that the osmotic pressures of the two compartments are equal is put into the second compartment; the selectivity $S_{us}$ is equal to the ratio of the transfer coefficients of urea and of sodium chloride:

$$S_{us} = \frac{U_{urea}}{U_{NaCl}};$$

these coefficients can themselves be calculated from the equation $$\phi = A \cdot U \cdot \overline{\Delta C} \cdot T$$

in which $\phi$ is the weight of solute transferred across the membrane during the time interval T, $\overline{\Delta C}$ is the logarithmic mean of the differences in concentration between the two compartments of the dialysis apparatus at the beginning and end of the time interval T, and A is the surface area of the membrane used.

The ionic membranes defined above may, if desired, be reinforced by an external or internal permeable support, for example a textile web; they can be of a homogeneous or heterogeneous type.

Polymers or copolymers which may be used for the production of the ionic membranes for use in the apparatus of this invention include: sulphonated styrene-divinylbenzene copolymers, chloromethylated and quaternised styrene-divinylbenzene copolymers, quaternised vinyl alcohol-vinylpyridine copolymers, sulphated ethylene-vinyl alcohol copolymers, ethylene-vinyl alcohol copolymers condensed with epichlorohydrin and then aminated, quaternised acrylonitrile-vinylpyridine copolymers, polycondensates obtained from polyhydroxyethers (polycondensation products of bisphenol with epichlorohydrin) by condensation with epichlorohydrin followed by amination, sulphonated polyarylethersulphones, sulphonated or chloromethylated and then aminated tetrafluoroethylene-styrene copolymers, and acrylonitrile-methallysulphonic acid copolymers; these may be used in the form of salts.

The apparatus of this invention can be used especially as an artificial kidney machine for the purification of blood, and especially for the elimination of waste matter such as urea. In this application the blood is subjected to an ordinary ultrafiltration and the ultrafiltrate is purified by dialysis.

The process for the continuous treatment of this ultrafiltrate of blood forms another embodiment of this invention. It is characterised in that the ultrafiltrate flows through a dialyser equipped with an ionic membrane and then is reintroduced into the blood, the second compartment of the said dialyser being traversed by a solution with an osmotic pressure less than or equal to the osmotic pressure of the ultrafiltrate.

The present invention will now be illustrated, merely by way of example, with reference to the accompanying drawings in which FIG. 1 shows, diagrammatically, a typical apparatus of the present invention.

FIG. 1 shows an apparatus of the invention used as an artificial kidney machine; an ultrafiltration cell is shown at 1, its ultrafiltration membrane being at 2; a dialyser is shown at 11, and its ionic membrane at 12. The first compartment of the ultrafiltration module is supplied, via a pipeline 3, with blood coming from a blood vessel of the individual subjected to treatment; a pipeline 4 allows the blood to be removed and to be reinjected into a vein of the patient. The ultrafiltrate is removed from the ultrafiltration cell, 1, by a pipeline 8 and is introduced into the first compartment of the dialyser 11. After having undergone dialysis, this ultrafiltrate is directed towards the blood circuit by a pipeline 9 which rejoins the pipeline 4 to form a pipeline 10; the pipeline 9 can also be connected directly to a vein of the patient. Ultrafiltrate purification solution can be introduced at 5 and removed at 6; it then flows into the second compartment of the dialyser 11. The flow of the various fluids can be created by means of pumps (not shown).

The ultrafiltrate flowing in pipeline 8 is essentially an aqueous solution containing salts and or acids, such as $NaCl$, $KCl$, $MgCl_2$, $CaCl_2$, $CH_3COONa$ and uric acid, as well as other products of low molecular weight such as urea, creatinine and sugars.

The purification liquid of the dialysis bath is a liquid which has an osmotic pressure lower than or equal to that of the ultrafiltrate; usually this consists simply of water. The osmotic pressure can be adjusted by any known means, for example by the addition of sugars to the liquid, or by lowering the pressure in it by means of a pump.

The osmotic pressure of the ultrafiltrate purification liquid can be constant or, alternatively it may vary; in particular, the osmotic pressure can be balanced with the osmotic pressure of the ultrafiltrate during certain periods of time, and then made lower than the latter osmotic pressure during other periods; in this way, temporary and intermittent micturition is, for practical purposes, achieved with human control.

The apparatus of the invention can also include safety devices, especially particle filters and bubble traps: the particle filters have the principal purpose of avoiding the introduction of coagulated material into the blood being re-circulated to the patient, and the bubble traps have the principal purpose of avoiding the introduction of air into the blood; these various safety devices are advantageously located in the pipeline 10.

The apparatus and the process of the invention have the particular advantage, in addition to their efficiency, of providing relatively small equipment which makes it possible to produce portable artificial kidney machines.

Figure 2:
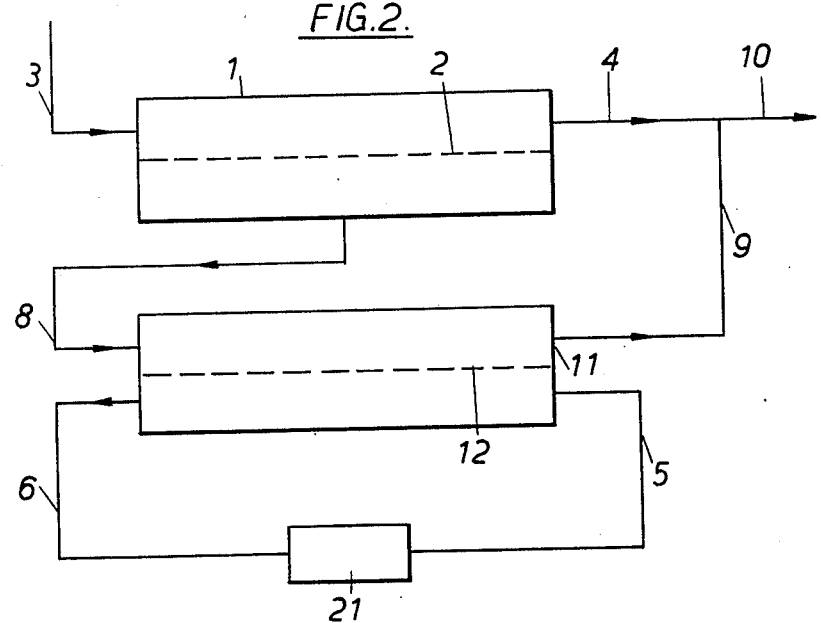

The apparatus and process of this invention can be made even better such that the ultrafiltrate purification liquid flows, in a closed circuit, successively through the second dialyser and through a device for removing waste material; in this embodiment, the liquid inlet and outlet pipelines of the second compartment of the dialyser are connected to a device for removing waste material. This embodiment is illustrated in FIG. 2; it can be seen that this differs from the apparatus of FIG. 1 only by the addition of a device 21 for removal of waste material. This removal device can be, for example, an absorption device in the most general sense of the word, thus including adsorption devices. The removal can be effected by a physical or chemical mechanism. Typical such devices are active charcoal columns and ion exchange resin columns; the waste materials concerned are essentially urea, uric acid and creatinine.

The following Example further illustrates the present invention.

EXAMPLE

The purification of human blood having a urea content of 1 g/liter is carried out in an apparatus similar to that illustrated in FIG. 1.

The membrane with which the ultrafiltration cell 1 is equipped has a surface area of 0.2 m² and a thickness of 40 $\mu$ in the wet state; it consists of an acrylonitrilesodium methallylsulphonate copolymer (containing 9% by weight [dry basis] of methallylsulphonate) treated with water under pressure at 145°C, (which gives it a "gel" type of structure, with a water permeability of 0.06 cm³/min.cm² at 2 bars). A pump, placed in the pipeline 8, creates a pressure difference of 600 mm Hg between the two compartments of the ultrafiltration cell.

The membrane with which the dialyser 11 is equipped has a surface area of 0.86 cm², a thickness of 33 $\mu$ in the dry state, a selective permeability of 77% and a selectivity $S_{us}$ of 28. It consists of a polymer produced as follows: a 2,2-bis-(hydroxyphenyl)-propane/epichlorohydrin polycondensate (reduced viscosity, measured at 25°C as a 2 g/l solution in dimethylformamide, of 36 cm³/g) is condensed with epichlorohydrin at 62°C in the presence of $BF_3$ etherate; the product obtained (% Cl: 8.1%) is aminated by means of a solution of $(CH_3)_3N$ in dimethylformamide at 70°C; it contains 1.95% of nitrogen and 7.17% of chlorine.

The blood is introduced into the ultrafiltration cell at the rate of 200 cm³/min; the ultrafiltrate flow rate in the pipeline 8 is 20 cm³/min.

The ultrafiltrate purification liquid is an aqueous glucose solution containing 56 g/l; its flow rate is 1 l/min.

On operating in this manner, the urea is removed at the rate of 1 g/hour; the sodium chloride of the blood is only removed at the rate of 0.5 g/hour.

We claim:

1. Apparatus for the purification of a liquid, which comprises:
   a. an ultrafiltration cell and an ultrafiltration membrane, dividing said cell into two compartments, an inlet and an outlet for said first compartment for the liquid to be treated and an outlet for the ultrafiltered liquid for said second compartment;
   b. means for establishing in the first compartment of said ultrafiltration cell a pressure higher than that prevailing in the second compartment of the cell; and
   c. a dialyser and an ionic membrane separating said dialyser into two compartments, an inlet for said first compartment connected to the outlet from the second compartment of the ultrafiltration cell and an outlet for said first compartment connected to the outlet of the first compartment of the ultrafiltration cell, the second compartment of said dialyser being itself equipped with an inlet and an outlet, said ionic membrane having a selective permeability greater than 50% and a urea/NaCl selectivity greater than 5.

2. Apparatus according to claim 1 in which the ionic membrane has a selective permeability greater than 70% and a urea/NaCl selectivity greater than 10.

3. Apparatus according to claim 1 in which the ionic membrane contains carboxylic, sulphonic, phosphonic or phosphinic acid groups or salified carboxylic, sulphonic, phosphonic or phosphinic acid groups, or sulphonium, phosphonium or ammonium groups.

4. Apparatus according to claim 1 in which a device for the removal of blood waste products is connected to the inlet and outlet from the second compartment of said dialyser.

5. Apparatus according to claim 4 in which the device is an activated charcoal or ion exchange resin column.

6. In a process for the continuous treatment of a blood ultrafiltrate the improvement which comprises passing the ultrafiltrate to a dialyser equipped with an ionic membrane, the second compartment of the dialyser being traversed by a purifying liquid with an osmotic pressure less than or equal to the osmotic pressure of the ultrafiltrate, and then reintroducing the resulting purified ultrafiltrate into the blood.

7. Process according to claim 6 in which the purifying liquid is water or an aqueous sugar solution.

8. Process according to claim 6 which is carried out in an apparatus which comprises:
   a. an ultrafiltration cell and an ultrafiltration membrane, dividing said cell into two compartments, an inlet and an outlet for said first compartment for the liquid to be treated and an outlet for the ultrafiltered liquid for said second compartment;
   b. means for establishing in the first compartment of said ultrafiltration cell a pressure higher than that prevailing in the second compartment of the cell; and
   c. a dialyser and an ionic membrane separating said dialyser into two compartments, an inlet for said first compartment connected to the outlet from the second compartment of the ultrafiltration cell and an outlet for said first compartment connected to the outlet of the first compartment of the ultrafiltration cell, the second compartment of said dialyser being itself equipped with an inlet and an outlet, said ionic membrane having a selective permeability greater than 50% and a urea/NaCl selectivity greater than 5.

9. Apparatus according to claim 1, in which the ionic membrane comprises a sulphonated styrene-divinylbenzene copolymer, a chloromethylated and quaternised styrene-divinylbenzene copolymer, a quaternised vinyl alcohol-vinylpyridine copolymer, a sulphated ethylene-vinyl alcohol copolymer, an ethylene-vinyl alkoxide copolymer in which the ether groups comprise amino-substituted polyethoxy groups, a quaternised acrylonitrile-vinylpyridine copolymer, a polyhydroxyether in which some, at least, of the hydroxy groups are etherified with amino-substituted polyethoxy groups, a sulphonated polyarylethersulphone, an amino-sulphonated styrene copolymer, an aminomethylated tetrafluoroethylene-styrene copolymer or an acrylonitrile-methallylsulphonic acid copolymer, or a salt thereof.

* * * * *